(12) United States Patent
Zamow et al.

(10) Patent No.: US 8,902,704 B2
(45) Date of Patent: Dec. 2, 2014

(54) METHOD AND DEVICE FOR LOGGING THE FLUID DEPTH IN A WELLBORE

(75) Inventors: Rainer Zamow, Hambuhren (DE); Kurt Sonnleitner, Gampern (AT)

(73) Assignee: Rohol-Aufsuchungs AG (AT)

(*) Notice: Subject to any disclaimer, the term of this patent is extended or adjusted under 35 U.S.C. 154(b) by 931 days.

(21) Appl. No.: 12/728,536

(22) Filed: Mar. 22, 2010

(65) Prior Publication Data

US 2011/0228637 A1 Sep. 22, 2011

(51) Int. Cl.
- *G01V 1/40* (2006.01)
- *G01V 1/44* (2006.01)
- *G01F 23/296* (2006.01)
- *E21B 47/04* (2012.01)

(52) U.S. Cl.
CPC .............. *G01V 1/44* (2013.01); *G01F 23/2962* (2013.01); *E21B 47/042* (2013.01)
USPC ................. 367/35; 367/99; 181/105; 181/124

(58) Field of Classification Search
CPC ...... E21B 47/042; G01V 1/44; G01F 23/2962
USPC ............ 73/152.16, 290 V; 166/64, 65.1, 113, 166/250.01, 250.15, 254.1, 369; 181/105; 310/321, 322, 323.01, 324, 326, 328, 310/369; 340/621; 367/40–43, 47, 81, 86, 367/98, 165, 190, 901, 908, 35; 381/396, 381/410, 71.11, 71.12; 417/36; 455/78, 84, 455/90.2; 702/14, 159, 9, 17, 85
See application file for complete search history.

(56) References Cited

U.S. PATENT DOCUMENTS

| | | | | |
|---|---|---|---|---|
| 3,939,418 A | * | 2/1976 | Morrison et al. | 455/84 |
| 3,965,983 A | * | 6/1976 | Watson | 166/250.15 |
| 4,564,927 A | * | 1/1986 | Kolb | 367/42 |
| 4,793,178 A | | 12/1988 | Ahern et al. | |

(Continued)

FOREIGN PATENT DOCUMENTS

| | | |
|---|---|---|
| DE | 3933116 | 4/1990 |
| DE | 19846870 | 1/2001 |

(Continued)

*Primary Examiner* — Daniel L Murphy
(74) *Attorney, Agent, or Firm* — Salter & Michaelson (57) ABSTRACT

In a method for logging the location of a fluid depth in a wellbore, an acoustic event is allowed to take place in a specific manner at the ground surface. This acoustic event generates pressure waves. The pressure waves travel in the wellbore downward. The pressure waves traveling in the wellbore are reflected at least also at the fluid depth. At the ground surface, the pressure waves traveling there out of the wellbore are picked up and the time of travel since the acoustic event is measured. The picked-up and measured pressure waves are analyzed and, together with the associated time of travel, the location of the fluid depth is deduced. The acoustic event generates a signal pattern having a predetermined, time-variable frequency spectrum. The signal pattern is emitted as vibration event into the wellbore, travels downward, and is reflected. At the ground surface, the picked-up signals originating from the wellbore are analyzed. During the analysis, vibration events that do not correlate with the emitted signal pattern are filtered out. From the vibration events that are among the picked-up signals and correlate with the emitted signal pattern and from the time of travel since the radiation of the signal pattern, the location of the fluid depth is deduced.

23 Claims, 3 Drawing Sheets

(56) References Cited

U.S. PATENT DOCUMENTS

| | | | |
|---|---|---|---|
| 4,890,266 A * | 12/1989 | Woodward | 367/99 |
| 4,934,186 A | 6/1990 | McCoy | |
| 5,027,655 A | 7/1991 | Sweet | |
| 5,038,067 A * | 8/1991 | Tabin | 310/334 |
| 5,081,613 A * | 1/1992 | Holzhausen et al. | 367/86 |
| 5,117,399 A | 5/1992 | McCoy et al. | |
| 5,200,894 A | 4/1993 | McCoy et al. | |
| 5,662,165 A * | 9/1997 | Tubel et al. | 166/250.01 |
| 6,094,623 A * | 7/2000 | Mintchev et al. | 702/85 |
| 6,272,441 B1 | 8/2001 | Peyerl et al. | |
| 6,418,079 B1 * | 7/2002 | Fleure | 367/40 |
| 2002/0096323 A1 | 7/2002 | Burris et al. | |
| 2004/0163806 A1 | 8/2004 | Hadley | |
| 2006/0002581 A1 * | 1/2006 | Akino | 381/410 |
| 2006/0037392 A1 | 2/2006 | Carkner et al. | |
| 2006/0291688 A1 * | 12/2006 | Nishimura et al. | 381/396 |

FOREIGN PATENT DOCUMENTS

| | | |
|---|---|---|
| FR | 2637367 | 4/1990 |
| FR | 2 672 678 A1 | 8/1992 |
| GB | 2226634 | 4/1990 |
| RU | 2 193 164 C1 | 11/2002 |

\* cited by examiner

METHOD AND DEVICE FOR LOGGING THE FLUID DEPTH IN A WELLBORE

FIELD OF THE INVENTION

The invention relates to a method for logging the location of a fluid depth in a wellbore during deep drilling, in which an acoustic event is allowed to take place in a specific manner at the ground surface, said acoustic event generating pressure waves, in which the pressure waves generated by the event travel downward in the wellbore, in which the pressure waves traveling into the wellbore are reflected at least also at the fluid depth, in which pressure waves traveling out of the wellbore to the ground surface are picked up there and the time of travel since the acoustic event is measured, in which the picked-up and measured pressure waves are analyzed and used, together with the associated time of travel, to determine the location of the fluid depth, and a device for determining the fluid depth in wellbores by using such a method.

BACKGROUND OF THE INVENTION

Wellbores serve, in particular, for discovering crude oil or natural gas and extracting it from subterranean deposits. The latter extend in horizontal and vertical direction, often over an extensive area, so that a plurality of wellbores are used for each individual deposit in order to recover the crude oil or the natural gas from the deposits.

In this process, each wellbore has tubing made up of a plurality of individual pipes, vertically adjoining one another, which, when the wellbore is introduced, are inserted one after the other and joined to one another. These pipes of the tubing extend down to and into the oil or gas deposit.

This means that the desired medium, that is, in particular, crude oil or natural gas, is located in the deepest region of the wellbore and can be extracted. For this purpose, there are pumps or other extracting devices in this region, which bring about a continuous or discontinuous upward extraction within the wellbore. Further quantities of crude oil or natural gas flow from the sides and from below to replace the withdrawn medium. In addition, water and/or other fluids accumulate in this lowest region of the wellbore. The surface of the fluids in relation to the ground surface is referred to as the fluid depth.

The adjoining pipes of the tubing of the wellbore are joined to one another in such a manner that a relatively tight, mechanically stable joint is formed and, in particular, no sand and no fluids can penetrate through the wellbore tubing into the interior of the wellbore. In this case, the pipes have pipe joints to one another, that is, coupling sites that are formed by the collars and coupling rings. The individual pipes are essentially roughly equal in length.

Often provided for technical reasons are two tubings that are put in place concentrically in each other. The crude oil or natural gas to be extracted flows upward in an inner pipe and, in an annulus concentrically surrounding the inner pipe from the outside, there takes place, among other things, a pressure equalization.

The precise location of the fluid depth in a wellbore has already long been of appreciable interest for improving the extraction operation. For example, it is undesirable for the oil pumping operation to withdraw more crude oil from the wellbore than can flow back into this wellbore from the deposit. In end effect, the wellbore would then run dry. Naturally, an effort is also made to withdraw as much crude oil or natural gas from the wellbore as possible. Because the rate at which the crude oil or natural gas flows back cannot be measured and, over the operating time of a wellbore, varies in an unforeseeable manner, the exact location of the fluid depth is a value of interest. If the fluid depth drops over the course of time during each of a number of observations, the fluid level also drops, so that it appears that more crude oil and natural gas is being withdrawn from the wellbore than can flow into the wellbore from the deposit. This would pose a possible danger as extraction continues. On the other hand, if the fluid depth rises, there exists the possibility of increasing the rate of extraction.

The location of the fluid depth in the wellbore can naturally be several hundred or even greater than 1000 m deep and is accordingly hard to log and determine from the ground surface. Optical measurements are ruled out in this case.

For the measurement of the water level in a wellbore, which serves as a well for extracting water, an acoustic measurement is proposed in U.S. Pat. No. 5,027,655. A signal having a known frequency is transmitted downward into the wellbore and a returning signal, reflected from the surface of the fluid, is utilized as a response signal. Taking into consideration the speed of sound, it is possible to determine the fluid level. In this case, the wellbore may not have any major discontinuities that act as strong reflectors for the emitted signal and therefore lead to interference with the result. U.S. Pat. No. 5,027,655 proposes, as a further modification, a variation of the frequency in order to determine a resonance frequency or an antiresonance frequency and to deduce from it the location of the water level.

Undertaken in practice are acoustic measurements such as described, for instance, in U.S. Pat. No. 4,793,178 and U.S. Pat. No. 4,934,186 as well as, in further developments, also in U.S. Pat. No. 5,117,399 and U.S. Pat. No. 5,200,894. A gas cannon is fired on the ground surface in the region of the wellbore and, in this way, generates at acoustic impulse, which has a very steep and high front flank.

Alternatively known, besides the firing of a gas cannon, is the generation of an impulse by implosion from a device offered by Friedrich Leutert GmbH & Co. KG under the name "Acoustic Well Sounder AWS." This method is suitable when, in the wellbore, there exists an overpressure with respect to the surrounding air. To this end, the uppermost section of the tubing in the wellbore is closed off by a pipe that can be shut at the upper end and at the lower end. In the first measurement step, the upper valve is then opened and the gas contained in the pipe escapes into the surroundings. Then, the upper shut-off valve is closed again. Afterwards, the lower shutoff valve in the wellbore is opened and the gas present under overpressure in the wellbore enters the pipe abruptly. This abrupt expansion of the gas present in the wellbore into the pipe also generates an impulse having a very steep and high front flank. Then, in the next step, the gas that is now contained in the pipe from the wellbore is expelled into the surroundings and the next measurement can take place.

The pressure wave generated by the firing of the gas cannon or else by the described implosion travels down through the wellbore to the fluid depth and is then reflected there. In this process, it is subject to the physical laws of sound waves.

However, the speed of sound in the wellbore is not known, because a complicated gas mixture, which, moreover, is not constant in time and which consists of, among other things, methane, nitrogen, carbon dioxide, argon, and many other gases, is present in the wellbore between the ground surface and the fluid depth and behaves in no way like an ideal gas and also changes in composition both with time and over the depth of the wellbore in an unforeseeable manner. This means that it is not possible to deduce automatically the distance of travel of a sound wave from its time of travel and it is not yet possible to make a quantitative statement about the distance of the path traveled from the time of travel of the sound wave from the ground surface to the fluid depth and, after reflection, back to the ground surface. Hence, the fluid depth cannot be determined only from the time of travel.

Also, smaller reflections take place at the individual joints of the pipes of the wellbore tubing, so that portions of the sound or pressure wave are reflected back even before the reflection from the fluid surface and can be recorded above at the ground surface by using an appropriate receiving device. These waves thus have a shorter distance of travel and hence also a shorter time of travel.

However, because the individual pipes are, as mentioned, of roughly equal length and the discrete reflections at the edges of the joints can be observed, an entire series of reflection lines of sound waves result, before the impingement of the sound wave reflecting from the fluid level, and these sound waves have reached only the individual pipe joints, that is, the coupling sites between the pipes, and been reflected there. If these reflecting sound waves can be identified and adequately clearly detected in the noise, then, by subtracting the reflection lines, it is possible to determine how many pipe joint lines lie between the ground surface at the wellbore and the fluid depth. With a known average pipe length, it is then possible to deduce the approximate location of the fluid depth and, by comparison of several measurements at intervals in time, it is also possible, in a later analysis, to deduce whether the fluid depth is rising or falling.

A problem is that there are multiple reflections, because each sound wave that reflects at a joint and travels upward is partially reflected anew at all of the above-lying joints and these doubly reflected sound waves travel downward and result in additional triple and multiply reflected sound waves that impinge at the ground surface due to renewed reflection and interfere with and appreciably hamper the identification of the reflection lines that are of actual interest. Hence, when the gas cannon is fired, a great deal of care must be applied to achieve an initial sonic event that is as clean as possible, that is, to obtain a flank that is as steep and as high as possible, which enables a later identification of desired and undesired reflection lines.

Proposed in U.S. Pat. No. 6,085,836, in view of this complicated situation, is to employ three separate signal generators, each of which emits a signal of a certain frequency, with the three frequencies being different from one another. These three signal generators are intended to then emit the sound waves generated by them separately from one another, first of all within a drill string, then outside of a drill string, and, finally, additionally in an annulus. Through reception of the reflected signals in the various wellbore regions and the assignment of the monofrequency sound waves to the initial signals, it is hoped to improve the measurement results and to make the measurements more reliable. The expense for signal generators that operate separately from one another and operate in separate regions of the wellbore cross section is appreciable. In practice, this proposal has not gained acceptance.

Besides the difficulties already discussed in the analysis of reflecting sound waves, it is desirable to prevent all interfering noise due, for instance, to running extraction pumps and the like, which could also interfere with the measurement result or falsify it. Thus, in such measurements using methods of prior art, it is necessary to interrupt the drilling operation for the time of the measurement in many cases.

In practical application, such an arrangement of devices involving a gas cannon and a receiving device as well as an associated electronic analysis and evaluation device is then employed in succession at the various wellbores of an oil field or other deposit. The analysis then takes place largely manually after all measurements have been concluded. From the resulting measured values, experts can then, insofar as required undertake measures at the individual wellbores to adjust the rate of extraction, for example.

In spite of the fundamental functional ability of such methods, there exists the desire in expert circles to be able to undertake this operating procedure at lower cost and, insofar as possible, also faster. To be taken into consideration in doing so is the fact that technical personnel are needed over a prolonged period of time for the operation in order to appropriately carry out and analyze measurements from a large number of wellbores. The arrangements of prior art are exacting and have to be used in places where the wellbores are located, which is often the case in impassable terrain that is not favorably located for vehicle access.

The problem of the invention is therefore to propose a class-specific method and a class-specific device by means of which an improved or simplified determination of the fluid depth in wellbores is possible.

SUMMARY OF THE INVENTION

This problem is solved in accordance with the invention for a class-specific method in that the acoustic event generates a signal pattern having a predetermined, time-variable frequency spectrum, in that the signal pattern is emitted as a vibration event into the wellbore, travels downward, and is reflected, in that the signals originating from the wellbore and picked up at the ground surface are analyzed, in that vibration events that correlate with the emitted signal pattern are filtered out of the picked-up signals during the analysis, and in that, from the vibration events that are among the picked-up signals and correlate with the emitted signal pattern and from the time of travel since the emission of the signal pattern, the location of the fluid depth is deduced.

In a device, this problem is solved in accordance with the invention in that, at the ground surface, a vibration-emitting device is provided, which generates signal patterns with a predetermined, time-variable frequency spectrum and emits them into the wellbore, in that a measuring device for receiving signals originating from the wellbore is arranged and set up, in that an electronic analysis unit is provided, which analyzes signals picked up by the measuring device and is set up so that the vibration events correlating with the emitted signal patterns are deduced and, from these correlated vibration events and the time of travel, the location of the fluid depth is deduced.

By using a method and/or a device according to the invention, it is possible to measure and display continuously and automatically the fluid depth at oil and gas extraction sites or at other deep drillings. The use of such a method and/or such a device affords a continuous knowledge about the behavior of the fluid depth at individual extraction sites of a crude oil or natural gas field. This continuous knowledge can make a decisive contribution to the optimization of the yield.

The method according to the invention as well as the device according to the invention may be employed not only in the extraction of crude oil, natural gas, or other natural resources, in particular fluid or gaseous natural resources, for the determination of the fluid depth, but also in geothermal applications. There, too, it is of interest to determine the location of the fluid depth in deep drillings in the wellbores created there, because an observation of the water level can also be important for geothermal applications.

The method and device according to the invention can also be employed in other applied cases in which, during deep drillings, the precise location of a boundary layer between a liquid and a gas may be of interest in wellbores.

Whereas the previously applied method for determining the location of the fluid depth is undertaken manually in each case by personnel in most cases and leads to temporary knowledge, which affords only unsatisfactory results, this is changed fundamentally by the invention.

In contrast to the methods of prior art, the invention does not work with an individual, as steep as possible flank of an acoustic event, which one attempts then to identify, following various reflections, from the mixture of the totality of returning signal patterns. Instead of this, work is done with a frequency spectrum, which, moreover, is also time-variable. The signal pattern, which is predetermined both in terms of time course and frequency, is emitted into the wellbore and—just as in prior art—reflected at the various pipe joints, even multiply if need be.

The measuring device in the device according to the invention at the ground surface thus picks up again a very complex and, at first glance, also very "confusing," complicated packet of signal patterns. On the basis of a recorded log, a user would never be capable manually of interpreting, in turn, the picked-up log showing the time-variable frequency spectrum.

However, the electronic analysis device is capable of determining, from the known composition of the emitted signal pattern in the picked-up composition, which reflections have actually taken place, because the individual signal patterns have indeed experienced, in their totality, the same reflection event, and the mathematical correction of a possible frequency-dependent, different reflection property of the various pipe joints is possible.

Due to the fact that a signal pattern passes through each individual reflection event, a corresponding determination can take place with appreciably greater precision than in prior art. The hitherto interfering multiple reflections now are no longer interfering, because they, too, are each passed through by an entire signal pattern and, on account of the time change of the individual frequencies of the emitted signal, can even be identified unequivocally.

As a result of these highly precise possibilities, vibration events that do not correlate with the emitted signal pattern because, namely, they are not based on a reflection of these signal patterns, but rather on wellbore-specific vibration events, can also be cleanly identified. Thus, they no longer interfere with the analysis and can be identified as wellbore-specific working events, even in the case when the signal amplitude caused by the working event is greater than that of the signal pattern generated in the device for the measurement.

In practice, this results in the appreciable advantage that the measurements by means of the method according to the invention and the device according to the invention can be carried out without having to interrupt the extraction operation. The extraction of, for example, crude oil from the wellbore can thus be continued with a running pump. The pump noises, the noises of moving parts and joints, and also the noise caused by the flowing fluid itself, which are obviously created in this extraction operation, do not interfere with the determination of the location of the fluid depth, because the noises in question are all noises that create vibration events that do not at all correlate with the signal patterns that are transmitted downward from the ground surface into the wellbore for purposes of the measurement. They can thus be excluded without question during the determination of the location of the fluid depth.

These working events specific to the wellbore can thus be filtered out during the determination of the exact location of the fluid depth, so that this determination can focus on the vibration events of actual interest.

In the process, it is especially of advantage when the ensuing analysis in the electronic analysis unit can then compare these picked-up and filtered-out additional vibration events also against, for instance, the other values provided in memory storage—for example, with typical vibration events that are emitted by an extraction device in the wellbore and were picked up, for instance, during an earlier measurement. These typical vibration events, which are to be recognized as being known, are then identified without any problem and in a proper manner and can be ignored.

In an especially preferred embodiment, moreover, it is possible to undertake simultaneously a monitoring of fixed and mobile process equipment components of the extraction site. This preferred embodiment provides, besides the hitherto conventional registration of electrical or mechanical malfunctions that have already occurred at extraction devices, a knowledge of deviations from the normal state that have crept in. As a result, the possibility of a more targeted preventive maintenance and service is created.

To be taken into consideration is indeed the fact that, at wellbores over the course of the operating time, failure and damage can also occur to the extraction devices, for instance. An early detection of such failure, damage, and other defects is of great value. Thus, failure due to, for instance, drill string breakage, leads to a very expensive retrieval and repair operation, which means a prolonged downtime for the entire wellbore. However, if a corresponding failure is detected early on, a markedly less costly replacement or repair of the drill string can be undertaken before damage occurs.

Such failure is often indicated already by vibration events, which, as such, are not significant and are also not noticed by persons who happen to be present at the wellbore, but which, through changes in the vibrational relationships and a monitoring of these changes, are indicated by the occurrence of additional vibrations that were not observed in the previous measurements, for instance.

The preferred embodiment makes use then of the possibility of considering more closely vibration events that are specific to the above-mentioned wellbore and do not trace back to the signal pattern that was emitted and reflected for the determination of the location of the fluid depth.

As mentioned above, the vibration events that do not correlate with the emitted signal pattern can be compared in the analysis unit with other values provided in memory storage—for example, with typical vibration events that can be assigned to normal working events in the wellbore.

However, if there occur vibration events that cannot be assigned or perhaps can be assigned to a vibration event deposited in memory storage that indicates a specific flaw, the user can be appropriately informed and can pursue this unknown vibration event, which was picked up in addition to the actual measurement and may possibly point to a malfunction of the extraction device, the drill string, or other elements.

In doing so, the user can be afforded right away an indication as to whether a certain flaw and what flaw is to be presumed and urgently inspected or whether a vibration event that is totally unknown and cannot be assessed by the analysis unit is being observed.

The method and/or the device allow, besides the automatic determination of the location of the fluid depth, also simultaneously a monitoring of moving process components for unspecific vibration events. Thus, for example, string anomalies as well as the running characteristics of downhole rotary pumps or motors or gears of the above-ground drive units can be monitored. Even for simple embodiments, 16 or more different malfunction scenarios can be evaluated individually or mathematically linked to one another and tracked in each cycle of measurement.

For further expanded process equipment monitorings, it is also possible to attach an additional sensor or sensor group to the analysis unit.

In accordance with the invention, then, it is possible in the preferred embodiment to measure the fluid depth by using only one sensor and analysis system as well as simultaneously to undertake the monitoring of extraction sites for this failure and damage.

The simultaneous observation possibilities of, on the one hand, possible flaws and, on the other hand, independent of each flaw consideration, the location of the fluid depth affords the operator of the wellbore appreciable advantages. Thus, he can undertake much more frequently a checking of the fluid depth at markedly lower cost, because, together with the determination of the location of the fluid depth, parts of the maintenance and flaw monitoring tasks can also be fulfilled at the same time, without incurring additional cost for the use of technical personnel or devices in the process.

Also possible is an inspection for an eventual correlation between a perhaps observed flaw and the location of the fluid depth during the observation of the flaw. This affords the possibility of long-term observations at intervals in time and the recording of the vibration events observed in each case, so that, in retrospect, it can additionally be established whether a possibly occurred flaw was already indicated during the preceding measurement.

It is of special advantage that, unlike the case for conventional equipment, particularly a stationary use at an extraction site becomes feasible due to the clearly simplified construction design. The equipment is then arranged in a stationary manner and monitors the wellbore regularly or even permanently, preferably continuously.

However, there are also embodiments that continue to enable a mobile use.

The method works in such a manner that a signal generator generates low-frequency electrical signals. These signals are converted to a signal pattern by means of a vibration converter in a measuring head. These signal patterns can propagate as pressure waves via the gaseous media in the wellbore, which are present between two pipes that run one inside the other.

Returning waves are also created at each of the pipe joints of the piping, as is the case for measurements of prior art. Here, too, the emitted wave forms are reflected at the boundary layer between gaseous and solid or fluid media, which may be present between the two pipes, hence also at the fluid depth.

The returning waves and the reflections of the boundary layer between the gaseous and the fluid media are received in the measuring head by an electronic sensor and then transmitted further to the analysis unit.

The analysis unit, in turn, calculates the number of pipe joints and the distance between the signal generator and the boundary layer between the fluid and gaseous media from the initial signal and the received return signals by correlation in the frequency and time range.

Unlike the case up to now, however, no explosion or implosion having a large, steep amplitude is produced by using a gas cannon in order to obtain the measuring signal.

Instead of this, in accordance with the invention, signal amplitudes that are as small as possible and have a known, continuous-time course are used.

In this case, resort is preferably had to a concept that is described mathematically in U.S. Pat. No. 6,272,441 B1, whereby, in contrast to that publication, low-frequency and not high-frequency signals are used. It was found in a manner surprising to the expert that this method, which was conceived for quite different areas of application in radar technology in the high-frequency range of about 100 MHz to 10 GHz, is especially suitable in accordance with the invention for the application purposes in a wellbore when, also in contrast to what is provided for in that publication, not high-frequency signals but rather low-frequency signals are used, such as lie in the frequency range of sound waves, for instance.

Thus, it is particularly preferred when the method is carried out with frequencies of between 5 Hz and 1000 Hz, preferably of between 5 Hz and 100 Hz.

In tests, these frequency ranges have proven to be particularly suitable.

Furthermore, the method has the great advantage that, during the measurement, no exchange of the medium in the measuring device takes place with the surrounding air, because the measuring head is a closed system.

This is an appreciable advantage in comparison to the known method, for instance, in which, by means of an explosion, overpressure in the atmosphere in the wellbore is exploited, which, however, results in portions of the gas in the wellbore escaping into the surrounding air, which may encounter objections for reasons of technical safety and also for ecological reasons.

It becomes possible by means of the invention to arrive at a continuous-time and automatically operating monitoring mode both during the measurement of the location of the fluid depth and during the monitoring of process equipment. Created is an innovative, fully electronic combined system that is suitable for stationary and mobile use at crude oil and natural gas extraction sites and can be fabricated as equipment in series as well. The method and the device make possible a very economical use even in the case of unfavorable external conditions.

The rate of recovery of the measuring operations for determining the location of the fluid depth may be selected practically at will and, depending on the external requirements, a time range of between a few seconds and intervals of months may be selected at will.

It is provided for in a particularly preferred manner that the analysis unit generates an electrical signal corresponding to each measured fluid depth. The value of this electrical signal is compared constantly to the target value of the fluid depth noted in the analysis unit. If the value for the measured fluid depth rises or falls, the power of the extraction device, that is, in particular, the pump at the wellbore, is changed automatically until the measured signal for the fluid depth has attained once again a predetermined target value.

Thus, by controlling the pump power, a control loop is created. For stationary equipment, it is thus possible, in the absence of technical personnel, to undertake an automatic control of the wellbore operation.

Such a control loop is not possible as such by using the methods and devices of prior art. The latter are able to determine a value for the location of the fluid depth at the wellbore practically only manually, which can then be utilized by users who are present, after checking and manual comparison with other values, for corresponding correction of the control of extraction devices. In accordance with the invention, however, the determination of the location of the fluid depth is very precise on the one hand and also safe and thus reliable and, on the other hand, it is fully automatic and does not require any user who checks and uses the measured values determined. The resulting control loop is thus not only very reliable and precise, but, furthermore, also markedly uncomplicated and hence cost-advantageous.

A preferred embodiment of the device is characterized in that a remote transmission device is provided, which undertakes a remote transmission of picked-up and/or analyzed results.

In such an embodiment, the continuously registered data of the location determination of the fluid depth can be employed for comparison against a deposit model of an entire crude oil and natural gas field and hence serve to optimize the control of all equipment in the region of the deposit.

In this embodiment, the information of the individual monitorings of the respective process components can be transmitted to a control room. It is also possible to link the individual analysis units, memory storage units, and display units on site into a network controlled by the control room. It is then possible at any time to make changes in parameters via remote access, to visualize the current measured values of the connected analysis units on site, and to display the behavior of the fluid depth of the individual extraction regions in three dimension, for example.

It is especially preferred when the vibration-emitting device has a permanent magnet and an excitation coil at a vibrating membrane.

This represents a reversal of the construction of a classical vibration generator, such as is known, for example, from conventional loudspeakers. By means of such a combination of permanent magnet and diaphragm as vibrating unit, it is possible to create a robust vibrator that is resistant to acids and bases. The construction makes possible operation both as an analog oscillator (that is, one that follows exactly the curve course of the electrical signal) and as a digital oscillator, which vibrates at an excitation frequency between two end points without intermediate positions.

Tests have resulted in an especially elegant possibility for setting up the device according to the invention. It is characterized in that the vibration-emitting device and the measuring device resort at least in part to identical elements.

Namely, it is possible to construct the vibration-emitting device, which, in end effect, is similar to a kind of loudspeaker, in common with the measuring device as well. This measuring device requires similar elements in order to be able to register pressure variations and thus operates, in end effect, fundamentally like a kind of microphone or pressure sensor.

Through the use of identical elements (in particular, the identical membrane), it is possible to dispense with a separate and very costly sensor, because, indeed, only certain characteristics of this pressure sensor are needed.

Surprisingly found to be usable have been devices that are used in other connections, for instance for siren tone generators. Such generators for producing a siren tone have emitting powers and characteristics such as those that diaphragm speakers also have. In particular, they also have a corresponding membrane.

The corresponding elements of the siren tone generators are used and, in the region of the membrane, holes are used to achieve an internal pressure equilibration in the installed state so as to take into consideration possible overpressures in the wellbore, which are not of interest for registering the pressure variations and, instead, would only encumber the membrane.

Therefore, this hole makes possible, for the first time, the use of high-sensitivity pressure sensors.

As tests have shown, the simultaneous use of the membrane as an element of the signal emitter or the vibration-emitting device and the measuring device makes it possible to attain an appreciably greater sensitivity. The form and number of the detectable echoes markedly increase.

In order to be able to exploit these advantages, an electronic changeover switch is inserted into the circuit. The changeover switch has to separate the operation between signal generation and signal reception and also control the corresponding further transmission of the signal.

DESCRIPTION OF THE DRAWINGS

An exemplary embodiment of the invention will be described in greater detail below on the basis of the drawing: Shown therein are.

DETAILED DESCRIPTION

Figure 1:
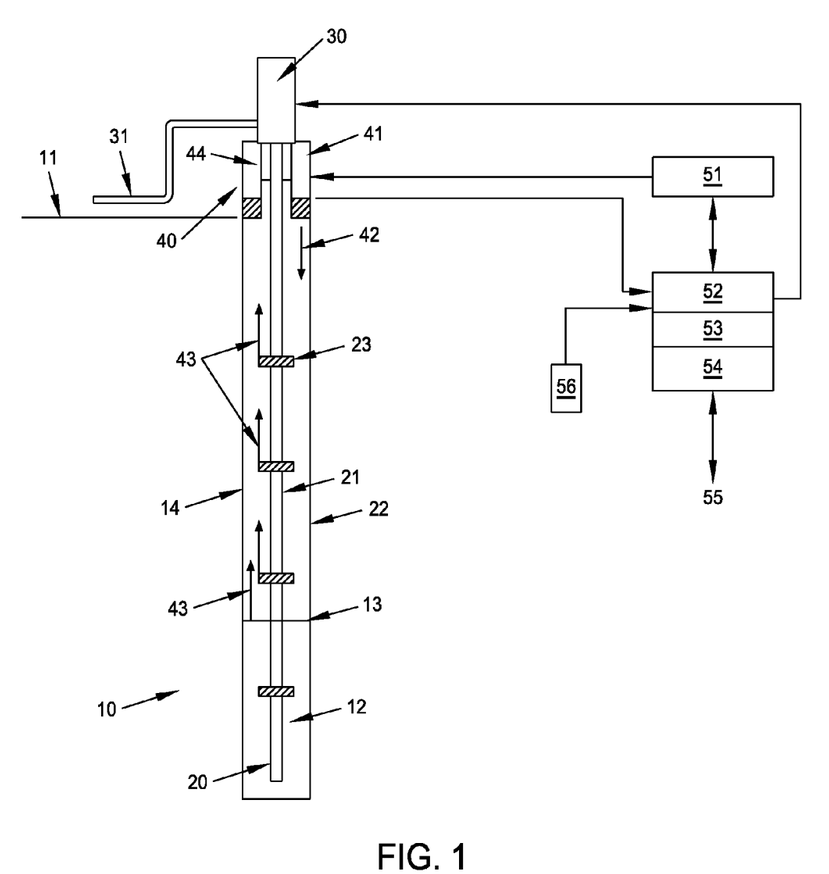
FIG. 1 is a schematic illustration of a wellbore having a device according to the invention.

Illustrated in FIG. 1 is a wellbore 10. The wellbore 10 extends from the ground surface 11 downward to a deposit for crude petroleum or crude oil. The crude oil 12 forms, together with additional fluids, a mixture that is separated by a boundary layer 13 from the various gases and gaseous media 14 forming above it. These gases are, among others, nitrogen, argon, and other components of the atmosphere and, in addition, methane and other gases that form above the crude oil. The composition varies over the course of time and also with the depth of the wellbore 10.

The precise location of the boundary layer 13 between the fluid substances containing the crude oil 12 and the gaseous media 14 constitutes a fluid depth. The precise location of this fluid depth 13 or of the boundary layer varies over the course of time, depending on the rate at which the crude oil 12 and the other fluids enter the wellbore 10 from the side and from below.

In order to extract the crude oil 12 from the wellbore 10 to the ground surface 11, a piping is provided. This piping 20, which extends vertically in the wellbore 10, comprises an inner pipe 21 and an outer pipe 22, which concentrically surrounds the inner pipe and simultaneously forms the pipe casing. The crude oil 12 is extracted upward through the inner pipe 21, while the pressure is equilibrated in the annulus between the inner pipe 21 and the outer pipe 22.

Both the inner pipe 21 and the outer pipe 22 of the piping 20 comprise a plurality of individual pipe sections, which are lowered in succession from the ground surface 11 into the wellbore 10 and, in the process, successively joined to one another via pipe joints 23. These pipe joints 23 are not seamless, but rather form collars, which are illustrated in highlighted manner in the schematic illustration in FIG. 1.

Illustrated above the ground surface 11 in a purely schematic manner is, in addition, a pump 30, which undertakes the extraction. Parts of the extracting device are naturally located as well (not illustrated) in deeper regions of the wellbore 10.

The fluid or crude oil 12 that is extracted to the ground surface 11 by means of the pump 30 is conveyed away via a pipeline 31 for further use.

A device 40 in the region of the ground surface 11 at the head of the wellbore 10 has, among other things, a vibration-emitting device 41. This emits a vibrational signal, which is to be described further below, in the direction 42 downward into the wellbore 10. The vibrational signal or the signal pattern 42, in the form of pressure waves, is reflected upward at the boundary layer 13 at the level of the fluid depth and additionally at all pipe joints 23, so that, here, a plurality of returning signals or signal patterns 43 result.

These returning signal patterns 43 are picked up in a measuring device 44 in the device 40. This measuring device 44 is, for example, a pressure sensor.

In the right area of the illustration in FIG. 1, it is indicated that the generation of the signal patterns 42 is accomplished in the vibration-emitting device 41 by way of an electrical signal generator 51.

The returning signal patterns 43 picked up in the measuring device 44 are analyzed in an electronic analysis unit 52. The corresponding results of the electronic analysis unit 52 are stored in a memory storage unit 53 and, in the embodiment illustrated, visualized in a display unit 54. The results can also, as illustrated, be transmitted further via a remote link 55, such as, for instance, a radio link or by means of a local area network or a wide area network, in order to enable the simultaneous analysis of several such devices 40 at several wellbores 10. The remote link 55 can also include a remote control, which enables tapping or else access to control.

Further indicated is an external signal sensor 56, which can pick up additional signals as well and feed them to the electronic analysis unit 52. The data from the electronic analysis unit 52 that originate from the external signal sensor 56 and, in particular, from the measuring device 44, can be used for controlling the pump 30 and, in this way, the rate of extraction of the crude oil 12 from the wellbore 10 can be optimized.

The electrical signal generator 51 generates low-frequency electrical signals. These signals are fed to the vibration-emitting device 41 in the device 40 at the upper end of the wellbore 10. There, they are converted into signal patterns 42 by means of a vibration converter (not illustrated). These signal patterns 42 are emitted as pressure waves and can propagate in the wellbore 10 via the gaseous media 14, which are located in the annulus between the inner pipe 21 and the outer pipe 22.

The returning signals or signal patterns 43 are then created, as mentioned, at the pipe joints 23 of the individual pipe sections of the piping 20. The emitted wave forms are additionally reflected at the boundary layer 13 between the gaseous media 14 and the fluids or solid and fluid media containing crude oil 12 in the lower region of the wellbore 10.

The returning signal patterns 43 are received by the measuring device 44 in the device 40 and converted to electrical signals and transmitted further to the electronic analysis unit 52. This electronic analysis unit 52 calculates, from the initial signal and the received returning signal patterns 43 by correlation in the frequency and time range, the number of pipe joints 23 above the fluid depth with the boundary layer 13, and from it, in turn, the distance between the vibration-emitting device 41 and the boundary layer 13 between the media 12 and 14.

The length of the individual pipe sections 23 is known or else is measured and, in contrast to the composition of the gaseous medium 14, is constant over time. This length of the pipe sections can be deposited in the memory storage unit 53 and will then be analyzed by the electronic analysis unit 52.

The electronic signal generator 51, in contrast to prior art, generates very small signal amplitudes. These signals have a predetermined continuous-time course. The electronic signal generator 51 can, by contrast, correspond to an arrangement such as that described schematically in U.S. Pat. No. 6,272,441 B1. However, in contrast to this known arrangement, low-frequency signals are used.

Large or steep amplitudes are not necessary.

Figure 2:
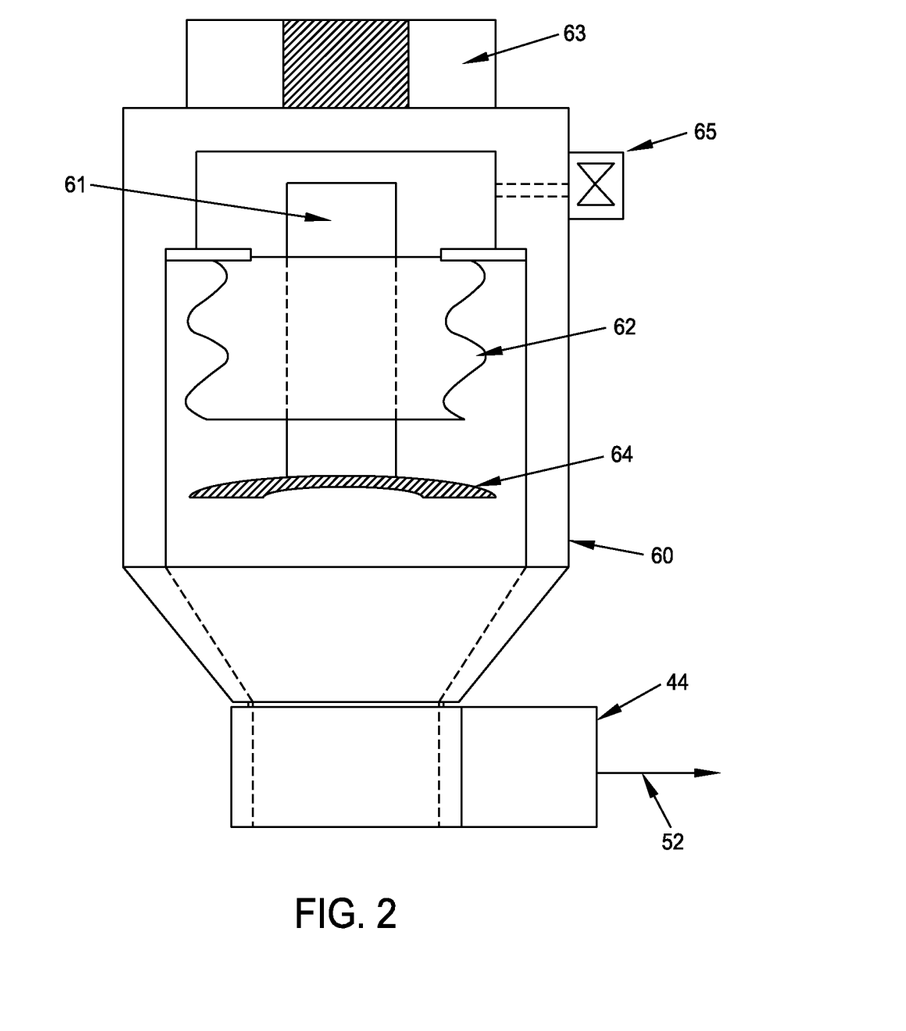
FIG. 2 is an enlarged illustration of a measuring head of the device according to the invention.

The device 40 with the vibration-emitting device 41 and the measuring device 44 is a closed system, which, in a preferred embodiment, is treated in more detail in FIG. 2. Therefore, during and also between various measurements of the fluid depth 13, no equipment medium is vented to the surrounding air.

The electronic analysis unit 52 generates, in each case depending on the measured values supplied to it by the measuring device 44, an electrical signal, which corresponds to the respective fluid depth 13. In a preferred embodiment, the magnitude of this electrical signal is compared constantly against the adjusted target value of the fluid depth that is known in the electronic analysis unit 52 or the attached memory storage unit 53. If, then, the value of the measured fluid depth 13 rises or drops, the power of the pump 30 is automatically changed by means of a control signal until the signal corresponding to the fluid depth 13 attains once again the desired target value.

The current values of the fluid depth 13 calculated in the analysis unit 52 from the measured values of the measuring device 44 are stored in the memory storage unit 53 and may, as needed, be transmitted via the data link 55 to higher-level process monitoring and control systems.

From the individual measured values of the extraction sites, together with their respective wellbores 10, that are connected to this higher-level system, it is possible to produce automatically a near-real-time, three-dimensional image of the fluid depth 13 of the respective deposits with their plurality of wellbores 10. Via the remote access 55 to the individual analysis units 52, it is possible, for optimization of the rates of extraction of all of the deposits, to adjust at any time the individual stored target values of the fluid depth 13 for the respective wellbores. The target value can thus be changed separately for each wellbore 10 depending on new higher-level knowledge.

The measuring operation of the fluid depth 13 in a specific wellbore 10 can be carried out in any arbitrary time interval practically without any limitation in the frequency of the measuring operations.

In addition to the reflected and returning sonic signals 43, the measuring device 44 also picks up vibration events of the process equipment devices of the extraction site at the wellbore 10. These vibration events afford information about the technical state of movable parts of the extraction devices, such as, for example, about the pump 30 and its components or else about movable parts of strings of piping 20. The picked-up vibration events are analyzed continuously in the analysis unit 52 on site and examined for significant changes in the time and frequency range as well as in the phase position. The analytical method can include standard methods of automatic machine monitoring (so-called CMS).

The analysis unit 52 offers for machine monitoring the connection of the above-mentioned external, additional signal sensor 56 or else a signal sensor group. These external signal sensors 56 also enable a monitoring of those vibration events within the process equipment that are not directly transmitted via the equipment components or the process media to the measuring device 44.

Both spontaneous system changes and those that creep in are identified, stored in the memory storage unit 53, transmitted using the remote transmission device 55, and/or visualized.

The simultaneous measurement of the location of the fluid depth 13 and the machine characteristics leads to appreciable advantages, because the two values can also be related to each other and hence make possible appreciable synergistic effects and added knowledge for the analysis. Thus, for example, the location of the fluid depth 13 can be taken into consideration in the interpretation of the vibration events coming from the wellbore 10.

A particularly suitable embodiment for simultaneously carrying out the two measuring methods accomplishes this with only one signal emitter, that is only one vibration-emitting device 41, and only one signal receiver, that is, only one measuring device 44. The embodiment is illustrated in FIG. 2 and shows a diaphragm speaker that is suitable for this.

A bar magnet or an iron core 61 is mounted by way of an elastic diaphragm 62 in a pressure housing 60. Mounted on the outside of the pressure housing 60 is an impulse magnet 63, which transmits the electrical signals generated by the electronic signal generator 51 to the bar magnet or iron core 61. The electrical signals of the electronic signal generator 51 are converted in this way to vibrations of the iron core 61. Connected to the iron core 61 is a schematically illustrated membrane 64, which thus vibrates along with the iron core 61.

The vibrations, as mentioned above, are low-frequency. They lie, in particular, on an order of magnitude of between 5 Hz and 1000 Hz, preferably between 5 Hz and 100 Hz. The vibrations of the membrane 64 are transmitted to the gaseous medium lying below the membrane 64 and said membrane, in turn, is in connection with the gaseous medium 14 in the annulus between the inner pipe 21 and the outer pipe 22 in the piping 20 in the wellbore 10 or else constitutes its uppermost region.

The electric signals of the signal generator 51 are thus transmitted as sonic signals or pressure waves or signal patterns 42 to the gaseous medium 14 in the wellbore 10 between the inner pipe 21 and the outer pipe 22.

The measuring device 44 with the signal receiver is located within the device 40 in a screw-on housing. This is indicated only schematically in FIG. 2. The data received by the measuring device 44 are transmitted further to the electronic analysis unit 52, which, here, in turn, is symbolized by an arrow.

Finally, a shut-off valve 65 is provided, which allows an adjustment of the pressure in the pressure housing 60 in the region outside of the membrane 44.

The entire construction is set up such that a use in tests up to interior pipe pressures of 300 bar was possible.

The advantage of the illustrated construction, which is indicated schematically in FIG. 2, consists in the fact that no cable leadthroughs into the pressure housing 60 are required. Furthermore, the housing can be designed to be relatively small.

Figure 3:
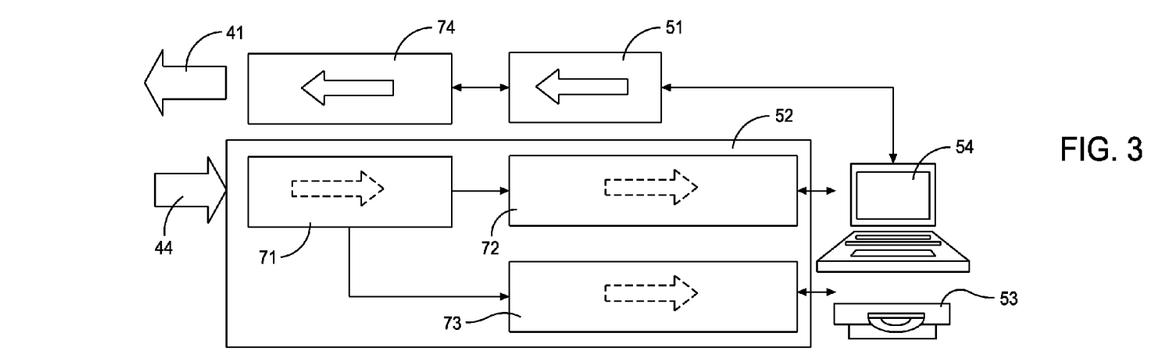
FIG. 3 is a schematic illustration of the further transmission of the signal in a first embodiment.

Illustrated in FIG. 3 is a schematic illustration of the form of the signal transmission, which, for instance, is employed for a use of a diaphragm speaker and a measuring head from FIG. 2.

Seen is a measuring device 44, which operates as a signal sensor. It transmits its signals further to the electronic analysis unit 52. The latter has a low-frequency amplifier 71, which appropriately amplifies the signal of the measuring device 44 and transmits it further to a unit 72 for a noise pattern analysis and to a unit 73 for a fluid depth determination. Afterwards, the data of the units 72 and 73 then go to a memory storage unit 53 and to a display unit 54 as well as any further data processing elements.

From there or directly from the electronic analysis unit 52, the data are transmitted further to the electronic signal generator 51, which, in turn, transmits them further via a second low-frequency amplifier 74 to the signal emitter or the vibration-emitting device 41.

Figure 4:
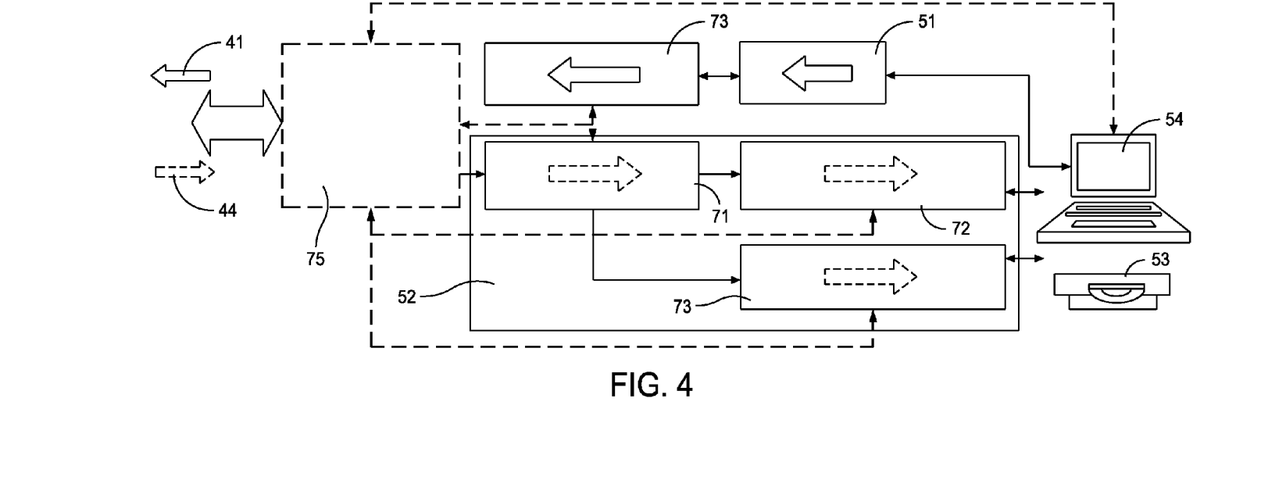
FIG. 4 is a schematic illustration of the further transmission of the signal in a second embodiment.

Illustrated in FIG. 4 is an alternative embodiment. Fundamentally, it has the same elements 41, 44, 51, 52, 53, 54, 71, 72, 73, and 74. However, there are additional elements.

This embodiment may then be employed to advantage when the use of a common device as a vibration-emitting device 41 and a measuring device 44 is accomplished, that is, when they are able to use the same membrane and also additional identical elements. In this case, a corresponding actuation and switching is employed in order to control the use for various application purposes.

Seen here, therefore, is a device 75 for synchronization or for use as a signal path changeover switch. This device 75 is supplied, on the one hand, with the data of the measuring device 44 and it transmits this data of the electronic signal generator 51 further to the vibration-emitting device 41. It ensures that the membrane can be used in each case as an emitting and receiving element.

The device 75 can then act directly on the other elements or receive data and information from them and thereby enables an even more direct and more informational analysis.

Instead of the two fully separated signal paths in FIG. 3, the branch generating the signal and the branch analyzing the signal are now connected together via an electronic changeover switch. This device 75 disposes over its own intelligence. Depending on the parameters set by the signal generator 51, which are set depending on the construction of the wellbore 10 and a maximally possible terminal depth of the fluid depth 13, the device 75 has to switch the sending path at the proper moment and activate the receiving branch.

On account of the different parameter settings, this operation varies in time. Nonetheless, it is possible to operate the phases precisely in relation to the sending signal.

Such changeover switches exist in the field of radar technology, but may also be modified for the low-frequency region in accordance with the invention.

A noise pattern analysis can equally take place, even when the fluid depth measurement is activated. Only for the time of emission of the excitation signal is the noise pattern analysis briefly interrupted.

In the embodiment of FIG. 4, a fluid depth measurement is thus possible using a combined sensor.

LIST OF REFERENCE SIGNS

10 Wellbore
11 Ground surface
12 Crude oil
13 Boundary layer or fluid depth
14 Gaseous medium
20 Piping
21 Inner pipe
22 Outer pipe
23 Pipe joints
30 Pump
31 Pipeline
40 Device
41 Vibration-emitting device
42 Signal patterns or pressure waves
43 Returning signal patterns or pressure waves
44 Measuring device
51 Electronic signal generator
52 Electronic analysis unit
53 Memory storage unit
54 Display unit
55 Remote transmission device
56 External signal sensor
60 Pressure housing 61 Iron core
62 Diaphragm
63 Impulse magnet
64 Membrane
65 Shut-off valve
71 Low-frequency amplifier
72 Unit for a noise pattern analysis
73 Unit for a fluid depth determination
74 Second low-frequency amplifier
75 Device

The invention claimed is:

1. A method for logging the location of a fluid depth boundary layer in a wellbore during deep drilling comprising the steps of:
   emitting, by means of a signal generator, an input acoustic signal at the ground surface of the wellbore, said acoustic signal generating pressure waves that travel downward in the wellbore;
   said acoustic signal emitted into a gaseous medium within the wellbore that is disposed above a wellbore fluid that is non-gaseous;
   receiving a return acoustic signal in which the pressure waves traveling into the wellbore are reflected at least at the fluid depth;
   said step of emitting including generating a signal pattern having a predetermined, time-variable frequency spectrum;
   identifying features in the return acoustic signal as reflections from respective pipe joints that are disposed along the wellbore by sensing the return signal patterns;
   identifying a feature in the return acoustic signal as a reflection at the boundary layer within the wellbore;
   analyzing the reflected pressure waves by calculating, from the input acoustic signal and the return signal patterns by correlation in the time-variable frequency spectrum, the number of pipe joints above the boundary layer, and from it, in turn, the distance between the signal generator and the boundary layer.

2. The method according to claim 1, further characterized in that, from the vibration events that are among the picked-up signals and correlate with the emitted signal pattern and from the time of travel since the emission of the signal pattern, the number of partially reflecting pipe joints of the piping between the ground surface and the fluid depth is deduced.

3. The method according to claim 2, further characterized in that, from the signals from the wellbore that are picked up at the ground surface, vibration events that do not correlate with the emitted signal pattern are filtered out and in that, from the vibration events that are filtered out and do not correlate with the emitted signal patterns, other events in the wellbore are deduced.

4. The method according to claim 3, further characterized in that, at the ground surface, recourse is had during the analysis to stored data of vibration events that relate to presumed vibration events during predetermined working events in the wellbore.

5. The method according to claim 4, further characterized in that, at the ground surface during the analysis, possible damage or threatening damage in the wellbore is deduced from vibration events that fit neither vibration events correlating with the emitted signal pattern nor stored data of vibration events that belong to the predetermined working events.

6. The method according to claim 1, further characterized in that at the ground surface, recourse is had during the analysis to data of vibration events stored in a memory and that relate to vibration events representative of predetermined working events characteristic of the wellbore, and comparing the signals picked up at the ground surface with the memory stored working events characteristic of the wellbore in order to filter out vibration events that correlate with the emitted signal pattern, and thus deducing the location of the fluid depth from the vibration events that are among the picked-up signals and correlate with the emitted signal pattern and from the time of travel since the emission of the signal pattern.

7. The method according to claim 6, further characterized in that low-frequency signal patterns are used.

8. The method according to claim 7, further characterized in that frequencies between 5 Hz and 1000 Hz are used.

9. The method according to claim 8, further characterized in that frequencies between 5 Hz and 100 Hz are used.

10. The method according to claim 1, further characterized in that, from the determined value for the location of the fluid depth and a predetermined target value of the location of the fluid depth and/or earlier determined values for the location of the fluid depth, a control signal for regulating the power of an extracting device at the wellbore is generated.

11. Device for carrying out the method according to claim 1 characterized in that, at the ground surface, a vibration-emitting device is provided, which generates the signal patterns with a predetermined, time-variable frequency spectrum and emits them into the wellbore in that a measuring device for receiving signals originating from the wellbore is arranged and set up, in that an electronic analysis unit is provided, which analyzes signals picked up by the measuring device and is set up so that the vibration events correlating with the emitted signal patterns are deduced and, from these correlating vibration events and the time of travel, the location of the fluid depth is deduced.

12. The device according to claim 11, further characterized in that the vibration-emitting device is supplied by an electronic signal generator with the electronically generated signal patterns, which are converted to vibration events in the vibration-emitting device.

13. The device according to claim 12, further characterized in that the electronic analysis unit is connected to a memory storage unit which stores the analysis events and/or contains the stored data from the vibration events that include vibration events for predetermined working events and/or for possible damage events.

14. The device according to claim 13, further characterized in that a remote transmission device is provided, which effects a remote transmission of picked-up and/or analyzed events.

15. The device according to claim 14, further characterized in that the vibration-emitting device has a permanent magnet and an excitation coil at a vibrating membrane.

16. The device according to claim 15, further characterized in that the vibration-emitting device and the measuring device have recourse at least in part to identical elements.

17. A method for logging the location of a fluid depth in a wellbore during deep drilling,
   in which an acoustic event is allowed to take place in a specific manner at the ground surface, said acoustic event generating pressure waves,
   in which the pressure waves generated by the event travel downward in the wellbore,
   in which the pressure waves traveling into the wellbore are reflected at least also at the fluid depth,
   in which pressure waves traveling out of the wellbore to the ground surface are picked up there and the time of travel since the acoustic event is measured,
   in which the picked-up and measured pressure waves are analyzed and used, together with the associated time of travel, to determine the location of the fluid depth, in that the acoustic event generates a signal pattern having a predetermined, time-variable frequency spectrum, in that the signal pattern is emitted as a vibration event into the wellbore, travels downward, and is reflected, in that signals originating from the wellbore and picked up at the ground surface are analyzed, in that vibration events that correlate with the emitted signal pattern are filtered out of the picked-up signals during the analysis, in that, from the vibration events that are among the picked-up signals and correlate with the emitted signal pattern and from the time of travel since the emission of the signal pattern, the location of the fluid depth is deduced, characterized in that, from the vibration events that are among the picked-up signals and correlate with the emitted signal pattern and from the time of travel since the emission of the signal pattern, the number of partially reflecting pipe joints of the piping between the ground surface and the fluid depth is deduced, further characterized in that a continuous emission of signal patterns or an emission that is carried out automatically in regular or predetermined intervals, having a predetermined, time-variable frequency spectrum, and an associated measurement and analysis takes place.

18. A device for logging the location of a fluid depth boundary layer in a wellbore during deep drilling, said device comprising: a vibration-emitting device which generates signal patterns with a predetermined, time-variable frequency spectrum and emits them into the wellbore; a measuring device for receiving signals originating from the wellbore and arranged and set up; and an electronic analysis unit which analyzes signals picked up by the measuring device and is set up so that vibration events correlating with the emitted signal patterns are deduced and, from these correlating vibration events and a time of travel of the generated signal, the location of the fluid depth is deduced, and wherein the electronic analysis unit includes means for identifying features in the return acoustic signal as reflections from respective pipe joints that are disposed along the wellbore by sensing return signal patterns; means for identifying a feature in the return acoustic signal as a reflection at the boundary layer within the wellbore; and means for analyzing the reflected pressure waves by calculating, from the input acoustic signal and the return signal patterns by correlation in the time-variable frequency spectrum, the number of pipe joints above the boundary layer, and from it, in turn, the distance between the signal generator and the boundary layer.

19. The device according to claim 18 wherein the vibration-emitting device is supplied by an electronic signal generator with the electronically generated signal patterns, which are converted to vibration events in the vibration-emitting device, and wherein the electronic analysis unit is connected to a memory storage unit, which stores the analysis events and/or contains the stored data from the vibration events that include the vibration events for predetermined working events and/or for possible damage events.

20. The device according to claim 18 wherein the vibration-emitting device is supplied by an electronic signal generator, and further including a synchronization device that, on the one hand, communicates between electronic signal generator and the vibration-emitting device, and on the other hand between the measuring device and the electronic analysis unit.

21. The device according to claim 20 including a measuring head having a membrane, the simultaneous use of the membrane functioning as an element of the vibration-emitting device and the measuring device.

22. The device according to claim 21 wherein the vibration-emitting device has a permanent magnet and an excitation coil at the vibrating membrane.

23. A system for logging the location of a fluid depth boundary layer in a wellbore during deep drilling, said system comprising:

a piping that extends vertically within the wellbore and that is comprised of a pipe casing;

a vibration-emitting device disposed at a top end of the pipe casing which generates signal patterns with a predetermined, time-variable frequency spectrum and emits them into the wellbore;

a measuring device also disposed at the top end of the pipe casing for receiving signals originating from the wellbore;

an electronic analysis unit connected to the measuring device and which analyzes signals picked up by the measuring device, the electronic analysis unit being constructed and arranged so that vibration events correlating with the emitted signal patterns and a time of travel are deduced and, from these correlating vibration events and the time of travel, the location of the fluid depth is deduced;

a memory for storing vibration events that relate to vibration events representative of predetermined working events characteristic of the wellbore;

a comparator for comparing the signals picked up at the ground surface with the memory stored working events characteristic of the wellbore so as to exclude signal patterns that do not correlate with the emitted signal patterns; and a filter to filter out vibration events that correlate with the emitted signal pattern, and thus deducing the location of the fluid depth from the vibration events that are among the picked-up signals and correlate with the emitted signal pattern and from the time of travel since the emission of the signal pattern; and wherein the electronic analysis unit includes means for identifying features in the return acoustic signal as reflections from respective pipe joints that are disposed along the wellbore by sensing return signal patterns; means for identifying a feature in the return acoustic signal as a reflection at the boundary layer within the wellbore; and means for analyzing the reflected pressure waves by calculating, from the input acoustic signal and the return signal patterns by correlation in the time-variable frequency spectrum, the number of pipe joints above the boundary layer, and from it, in turn, the distance between the signal generator and the boundary layer.

* * * * *